March 27, 1934.  C. G. KELLER  1,952,075
VEHICLE WHEEL
Filed April 9, 1927  5 Sheets-Sheet 1
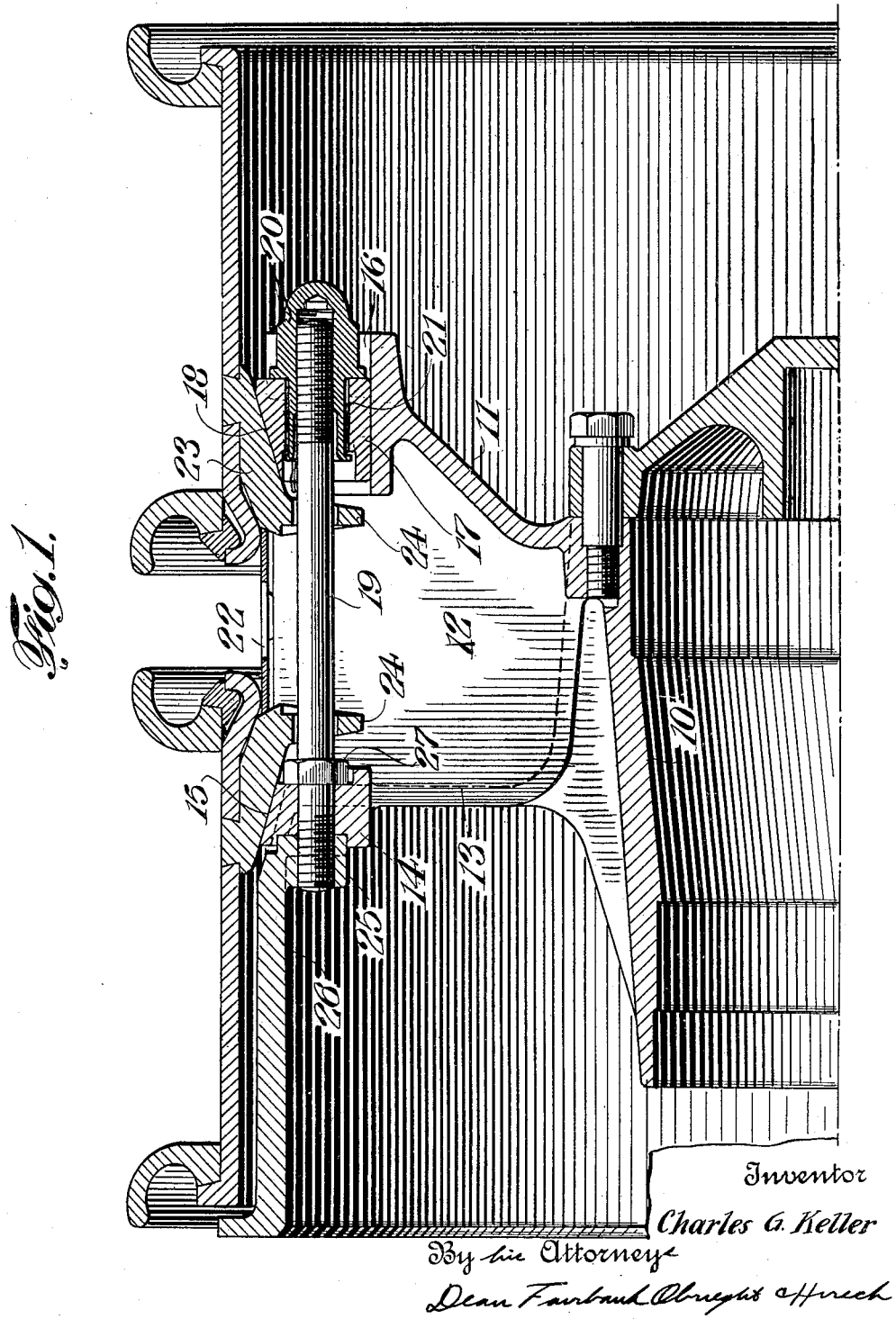
Inventor
Charles G. Keller
By his Attorneys
Dean Fairbank Obrecht & Hirsch March 27, 1934.   C. G. KELLER   1,952,075
VEHICLE WHEEL
Filed April 9, 1927   5 Sheets-Sheet 2
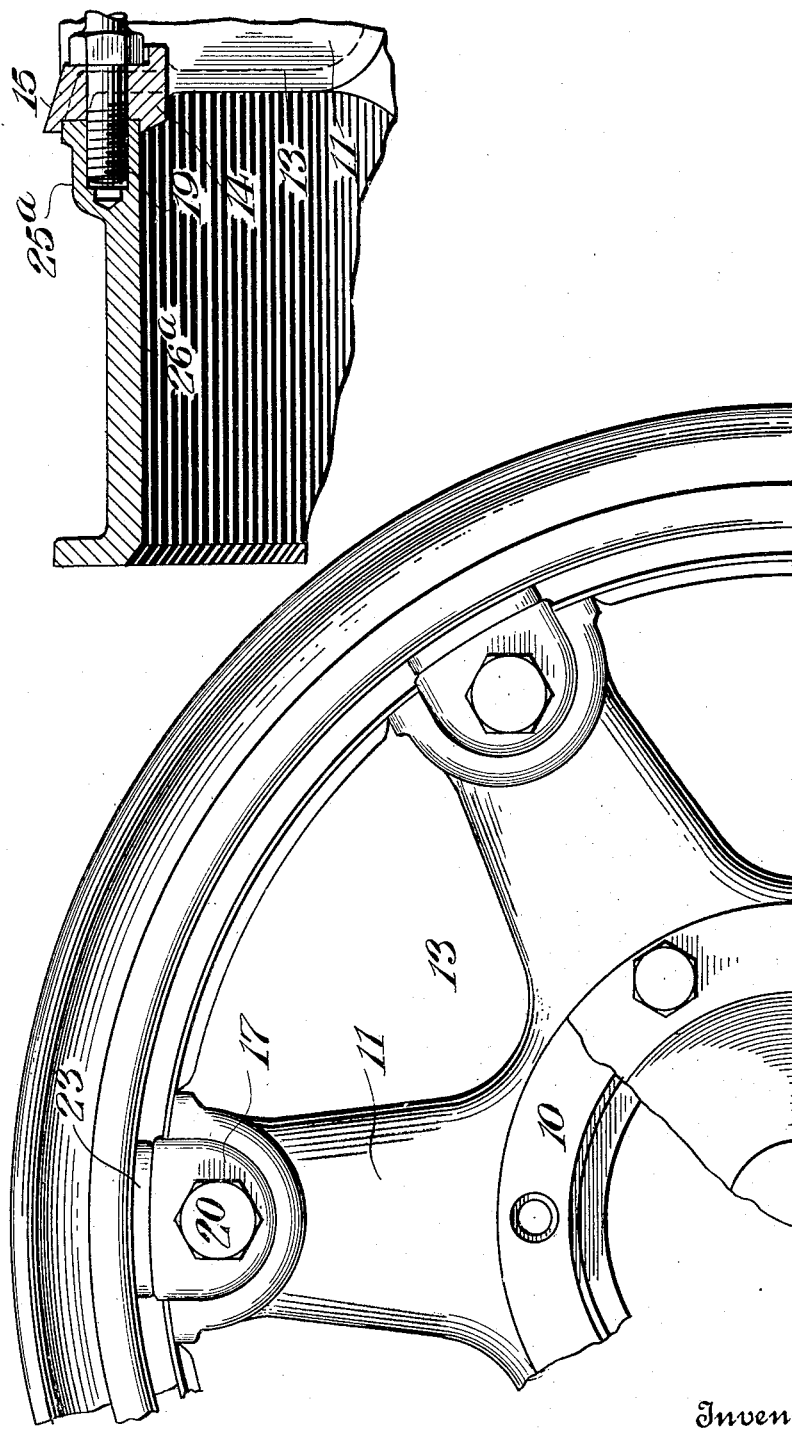
Inventor
Charles G. Keller
By his Attorneys March 27, 1934.   C. G. KELLER   1,952,075
VEHICLE WHEEL
Filed April 9, 1927   5 Sheets-Sheet 3
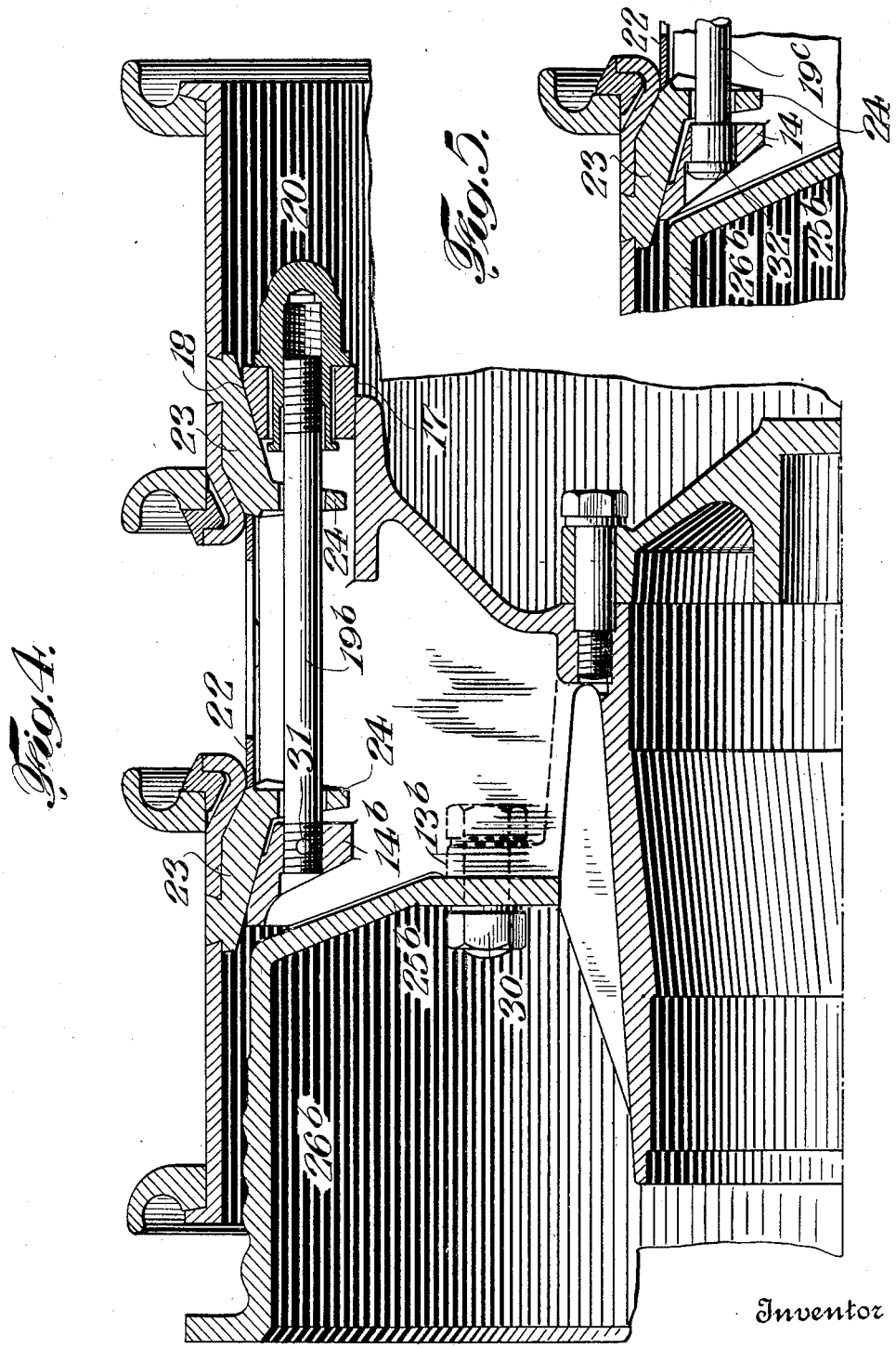
Inventor
Charles G. Keller
By his Attorneys

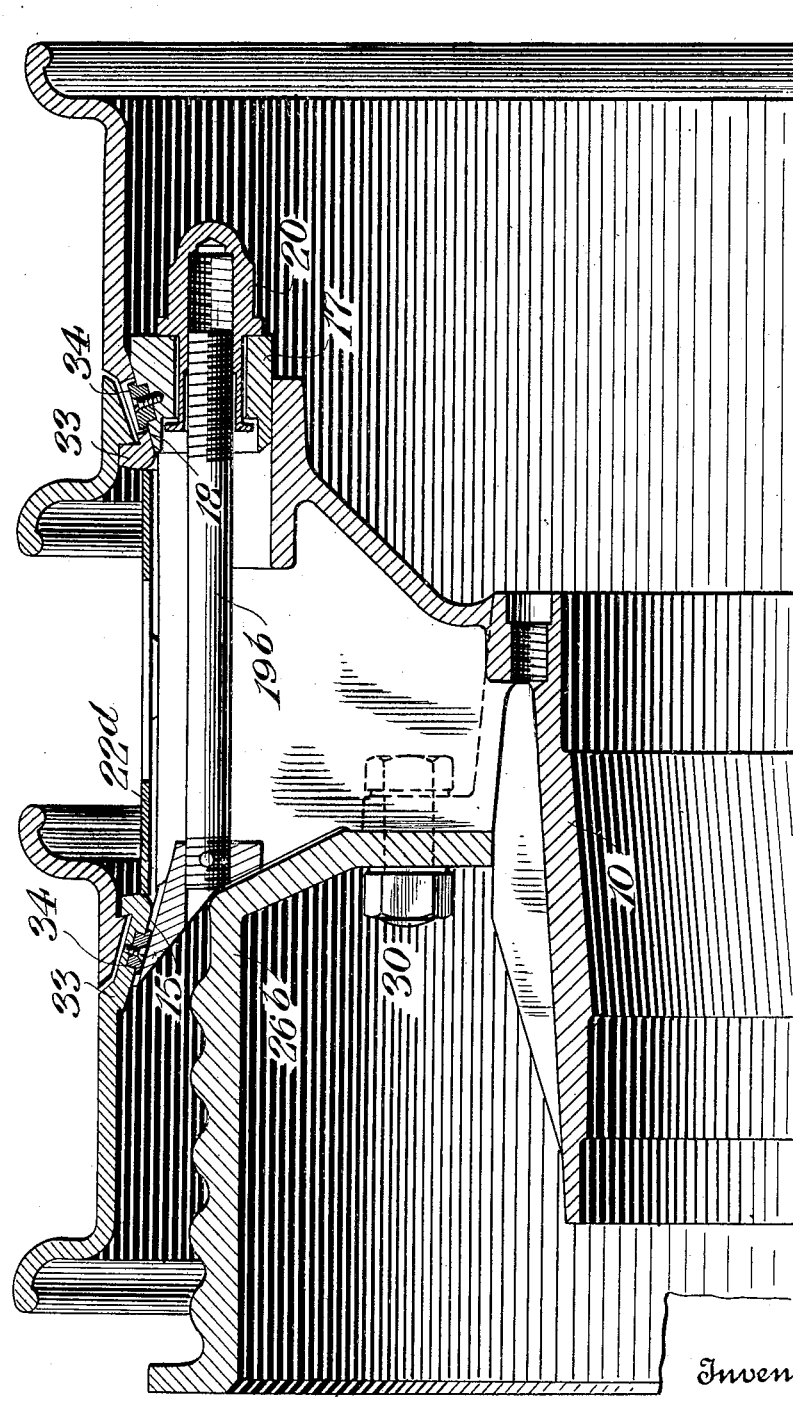

March 27, 1934.　　　C. G. KELLER　　　1,952,075
VEHICLE WHEEL
Filed April 9, 1927　　　5 Sheets-Sheet 5
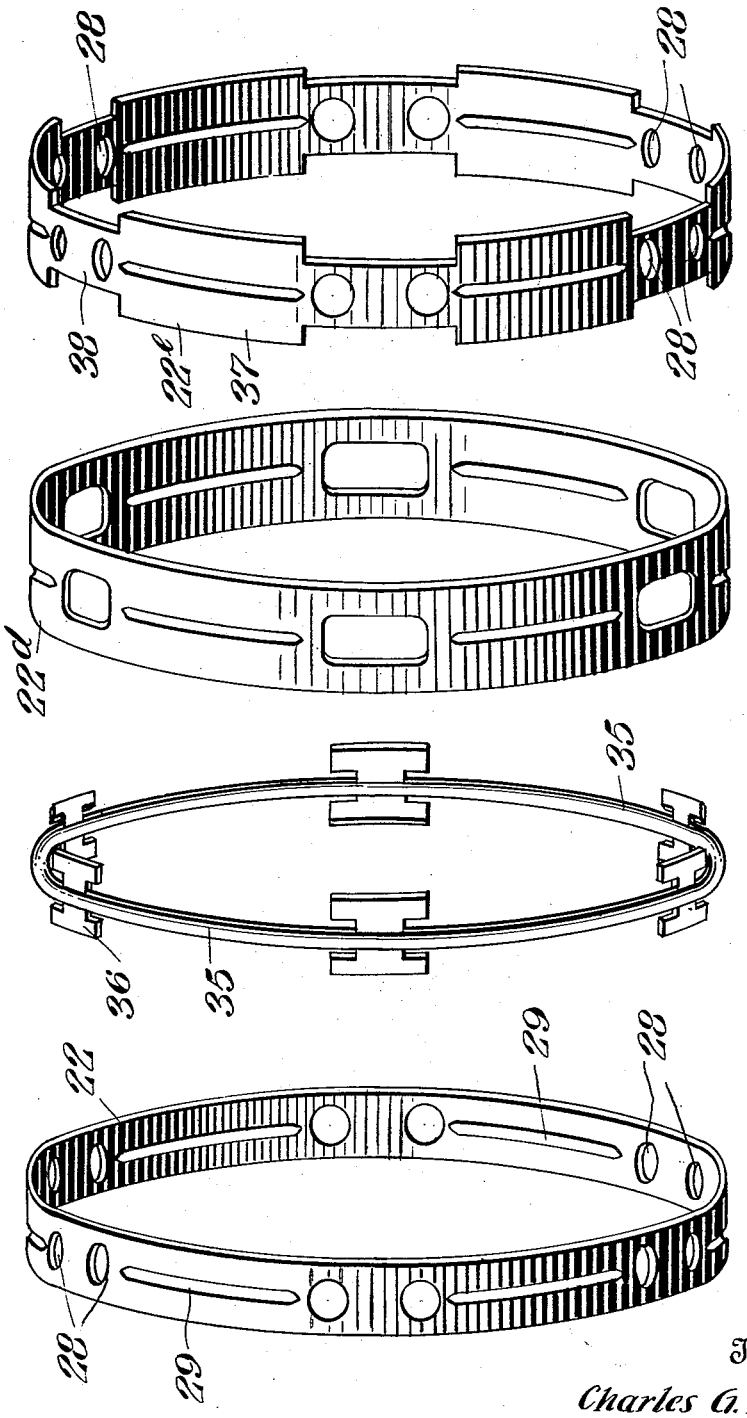
Inventor
Charles G. Keller
By his Attorneys Patented Mar. 27, 1934

1,952,075

UNITED STATES PATENT OFFICE 1,952,075

VEHICLE WHEEL

Charles G. Keller, Poughkeepsie, N. Y.

Application April 9, 1927, Serial No. 182,199

6 Claims. (Cl. 301—12)

This invention involves certain improvements in vehicle wheels, particularly of the dual or twin tire type. The invention relates more particularly to the means employed for supporting and securing the tire carrying rims.

Among the objects of the invention, are to reduce the number of parts which must be separately removed to permit the two rims to be taken off; to simplify and improve the means for holding the rims in the desired spaced relationship; to simplify the means for holding the brake flange in place, if one be employed; and to facilitate the cooling of the tires by the delivery of air through the spokes and rim spacing means.

As one important feature of my invention I mount the rim securing bolts on the wheel so that they do not have to be removed in taking off the rims. As another feature, I connect the rim clamps with the bolt nuts, so that they are taken off and replaced together. As another feature I secure the brake flange to the wheel by the same bolts that hold the rims in place. As a further feature, I provide annular members which are independent of the clamping bolts and which serve to space the rims. These may be made of any desired width, so as to hold the rims in any desired spaced relationship. As another important feature these annular members are provided with apertures which register with passages in the body of wheel, whereby the rotation of the wheel causes the delivery of air currents outwardly between the two tires to cool the latter and the brake parts within the brake drum. As another important feature the wheel body has apertures or grooves which register with the lugs on the rims and permit the insertion of clamping means for the same.

In the accompanying drawings I have illustrated certain embodiments of my invention, but it will be understood that various changes may be made within the scope of the invention as defined in the appended claims.

In these drawings:

Fig. 1 is a central longitudinal section of a portion of a wheel constructed in accordance with my invention.

Fig. 2 is an end view of a portion of the wheel shown in Fig. 1.

Fig. 3 is a detail similar to a portion of Fig. 1, but showing an alternative construction of brake flange.

Fig. 4 is a section similar to Fig. 1, but showing certain alternative features of construction.

Fig. 5 is a section similar to a portion of Fig. 4, but showing a further modification.

Fig. 6 is a view similar to Fig. 4, but showing the same wheel used for supporting a different type of rim, and Figs. 7 to 10 inclusive are perspective views of rim spacing members which may be employed.

I have illustrated my invention as applied to a wheel in which a hub 10 has cast integral therewith a plurality of spokes 11. The wheel is of the felly-less type and the spokes are substantially U-shape in cross-section so as to form radial passages 12 through which air is caused to flow by the action of centrifugal force during the rotation of the wheel. This construction is shown in my prior Patent 1,827,790, issued Oct. 20, 1931. The edges of the side walls of the spokes may be connected by a web 13. The two walls of each spoke are connected adjacent their outer ends by a bridge piece 14. If the web 13 extends to the outer ends of the spokes, its outer portion together with the bridge pieces 14, may form a continuous annular portion of the wheel. These bridge pieces and the outer edge of the web present an inclined surface 15 serving as a seat for the inboard rim.

The radially outward wall of each spoke which is the web of the U is provided with a guideway or groove extending substantially parallel to the axis of the wheel, and preferably substantially semi-circular in cross section. Within each groove there is mounted a slide 17 which is semi-cylindrical, and which presents an inclined surface 18 serving as a seat for a second rim.

Each bridge piece 14 carries a clamping bolt 19 which is rigidly secured in position, and which extends lengthwise through the grooves 16 and through a hole or aperture in the corresponding slide 17. This bolt is excentrically mounted with respect to the semi-cylindrical surface of the guideway as shown in Fig. 2, so that the slide 17 can not rotate to any material extent with respect to this guideway when seated therein. Each clamping bolt has a nut 20 at its outboard end, and each nut is preferably connected to its corresponding slide in such a manner that there may be relative rotation of the two, but relative endwise movement is prevented. As shown, each nut has a sleeve or shank portion 21 extending through the hole or aperture of the slide and having its inboard end beaded or spun over to engage a shoulder at the inner portion of the slide. Thus when the nut is turned in either direction the slide is forced to follow and when the nut is taken off the slide remains permanently attached thereto. The inner end of the sleeve or shank preferably has a recess extending lengthwise thereof and slightly larger than the bolt so as to serve as a guide in bringing the nut into position and to hold the latter substantially in alignment with the bolt to facilitate the quick and accurate starting of the threads.

The two surfaces 15 and 18 are adapted for supporting two separate rims. To hold these rims in the desired spaced relationship there is provided an annular spacing member 22 of such diameter that it may slide over the outer end portions of the spokes and may directly engage with the two rims. Certain features of this annular spacing member will be referred to more particularly hereinafter.

In Fig. 1 I have illustrated the wheel as being equipped with a pair of rims, the details of construction of which form no portion of my invention. The rims illustrated are of a type commonly known on the market as Firestone rim. Each rim has a plurality of lugs 23 each presenting a radially inward inclined surface which corresponds approximately to the inclination of the rim supporting surfaces 15 and 18. These lugs have radially inwardly extending ears or projections 24 which may be partially or entirely cut off if desired, but which are preferably perforated to receive the clamping bolts 19. The ears 24 thus prevent any possible creeping of the rims. The spacing member 22 is of such diameter that its opposite edges engage the ends of the lugs 23 and thus limit the spacing of the rims.

In the construction shown in Fig. 1 the clamping bolts 19 serve not only for holding the rims in position, but also serve for supporting the brake flange. I have shown the bridge pieces 14 as provided with annular grooves or recesses receiving the end portion 25 of a brake flange 26. The end portion projects inward radially from the body of the flange and has threaded apertures to receive the bolts 19.

In assembling the construction, the brake flange is placed in position and firmly secured by means of the bolts 19. Each bolt may have a hex portion 27 for engaging one side of the corresponding bridge piece 14, so that upon rotating the bolt the brake flange is tightly clamped in position. The bolt may then be doweled or otherwise locked against rotation, if desired. In putting on the rims it is merely necessary to slide on the first rim until its lugs 23 seat on the surfaces 15. Thereafter the spacing ring 22 is put on and then the second rim is placed in position. The several nuts 20 are screwed on to the bolts and serve to force the slides 17 in until by their engagement with the lugs 23 of the outboard rim, all of the parts are rigidly connected. It will be noted that both of the rims are clamped in position by the use of only the single spacing ring and the several combined slide and nut units.

The form of annular spacing member shown in Fig. 1 is that illustrated in perspective in Fig. 7. The member may be made of a piece of strip steel cut to the desired length and butt-welded to form a band. The width of the band may be varied to secure different spacings of the two rims. The band is provided with apertures 28 which come opposite to the end of the air passages 12 in the spokes and upon opposite sides of the several clamping bolts. Thus the air may flow from the passage through the apertures 28 and outwardly between the two tires. In order to insure the proper positioning of the apertures 28 in respect to the air passages, any suitable guide means may be employed. As illustrated, the portion of the band between successive apertures is provided with a radially inwardly extending bead 29. The internal diameter of the band from one bead across to another is such that the band cannot be slipped on with these beads opposite the ends of the spokes. The band must be so positioned that the beads come between adjacent spokes and therefore the apertures 28 will register with the ends of the spokes.

In Fig. 3 I have illustrated a portion of a wheel which may be constructed identically with that shown in Fig. 1, except that the brake flange 26a is of smaller diameter and the end portion 25a extends radially outwardly rather than radially inwardly therefrom. Thus it will be noted that any desired diameter of brake drum, and with a radially inward or outward operating surface may be secured in place by the clamping bolts 19.

The use of a single set of bolts as a part of the brake flange securing means and as a part of the rim securing means is not claimed herein, but is claimed in my Patent 1,851,187, issued March 29, 1932.

In Fig. 4 there is illustrated a construction similar to that shown in Fig. 1, except that the ordinary brake drum is employed and this is secured in the ordinary way, entirely independently of the clamping bolts which hold the rim in position. I have illustrated a brake drum 26b having a radially inwardly directed end wall 25b which is bolted to a narrow web portion 13b by means of bolts 30. The clamping bolts 19b are threaded into the bridge piece 14b and may be locked against any loosening action by a dowel pin or key 31.

In this figure I have shown narrower rims which are spaced apart to a greater distance in order to maintain substantially the proper distance between the center lines of the rims. This requires a wider spacing ring 22. It will be obvious that spacing rings of any desired width may be provided for use in accordance with the size of tires and rims to be used. It will also be noted that in Fig. 4 the nut and slide are not moved in to as great a distance as in Fig. 1, but by reason of my improved construction the same efficient clamping action is secured in one position as in the other. The sleeve 21 on the nut serves not only to carry the slide, but serves to provide increased length of threaded section for engagement with the bolt.

Instead of having the clamping bolt screwed into the bridge piece and held by a dowel pin, as in Fig. 4, I may use clamping bolts 19c each having a head portion 32 as shown in Fig. 5. These may be driven through the bridge pieces from the inner end, as shown in Fig. 5. The portion fitting the aperture of the bridge pieces may be non-circular to prevent rotation of the bolt, or a dowel or key may be provided. In this construction it is somewhat easier to remove the clamping bolt, if for any reason that is desired.

It will be noted that the bridge 14 of Fig. 1 serves three functions, namely, to support the brake flange, to support the rim, and to support the clamping bolt 19. In the construction shown in Fig. 4, the bridge 14b serves only two of these functions. It will be obvious that the portion of the bridge which serves to support the clamping bolt might be separate and independent of the portion which supports the rim, particularly where a rim, such as that shown in Fig. 6 is employed.

My improved wheel construction is adapted for carrying other forms of rims than that illustrated in Figs. 1, 4 and 5. In Fig. 6 I have illustrated a wheel construction substantially identical with that shown in Fig. 4, except that the wheel carries a pair of rims of a type commonly known as the Goodyear rim. These rims have annular portions 33 with radially inwardly facing inclined surfaces of approximately the same angle as the radially inward surface of the lugs 23 of the Firestone rims. The two rims may be secured in place in the same manner as the other type of rim, and may be spaced by an annular member 22d (see Fig. 9). This clamping ring is materially wider than that employed with the Firestone tire, due to the fact that the shoulders at the ends of the inclined portions are differently positioned than the shoulders on the lugs of the Firestone rim. For preventing creeping of the rims one of the spokes and one of the slides may have their inclined surfaces 15 and 18 provided with means for interlocking with the rims. Such means is shown in Fig. 6 as a removable pin or projection 34 engaging a groove or recess. The pin may be on the rim as shown at the left of this figure or may be on the inclined surface and engage the rim as shown at the right. Other means to prevent creeping might be employed.

In Fig. 8 I have illustrated a form of annular spacing member which may be used with either the Firestone or the Goodyear rim. This includes a rod 35 bent to form a ring with the ends welded together. At the desired points along the length of the ring are transverse plates 36 which may be welded to the ring or formed integral therewith, and which serve to engage the lugs of the rims or the rim side faces to hold them in spaced relationship.

In Fig. 10 there is illustrated a spacing member 22a which may be employed with either the Firestone or the Goodyear rim. It has wide portions 37 which may engage between the annular portions 33 of the Goodyear rims, such as shown in Fig. 6, and it has narrower parts 38 which may engage the lugs of the Firestone rim, such as shown in Fig. 2. These narrower portions have the apertures 28 for registering with the air passages in the spokes. By the use of the spacing member shown in Fig. 10, one Firestone and one Goodyear rim, or a pair of either type, may be used on the same wheel, and with the same spacing member.

It will be noted from Fig. 1 that the spacing ring does not form any portion of the support for either rim. The rims are supported solely from the surfaces 15 and 18, and the spacing ring merely holds the rims against endwise movement. As the edge of the ring abuts against shoulders on the rims the distance between the rims is fixed by the width of the ring.

The extent to which the wheel is ventilated or the tires cooled may be varied at will as the spacing rings may be provided with a large number of openings or the openings themselves may be larger, or if no air circulation is desired the spacing members may be imperforate.

The annular spacing rings may serve for the driving of the rims, that is to prevent creeping of the rims in respect to the wheel. This may be accomplished in various ways, for instance, by providing lugs at the edges of the members for engaging the edges of the spokes.

In the form illustrated, the beads 29 terminate at such points that the ends of the beads engage the sides of the spokes and thus prevent any creeping of the spacing members with respect to the wheel. The engagement of the rim and the wheel through the agency of the lugs 24 prevents any relative rotation or creeping of the rims in regard to the spacing members.

In my improved construction the wheel is very light and the tires are cooled and their life increased by the air current between them. There are the minimum number of loose parts. The mounting of the slides 17 in the guiding recesses 16 in such a way that they move parallel to the axis of the wheel insures that all of the members will be pressed truly and accurately to their seating position and it also permits relative rotation or oscillation of the slides so that their inclined seating surfaces will properly engage the inclined surfaces of the rims. The mounting or dismounting of the rims is a very simple one. The spacing between rims may be varied or rims of different sizes used, without change in the structure of the body of the wheel, and the brake is cooled by the suction of hot air from inside of the drum. The construction embodies various other advantages which will be apparent from a consideration of the preferred form.

Having thus described my invention, what I claim as new and desire to secure by Letters Patent is:

1. A vehicle wheel having a rim seat, a row of axially projecting bolts at one side thereof, slides movable along said bolts and presenting a second rim seat, a pair of rims engaging with said seats and each having a radially inwardly projecting lug for engagement with one of said bolts to prevent creeping of the rims, and a rim spacer including an annular band having its opposite edges in abutting engagement with said rims, and having recesses in said edges to receive said lugs.

2. A vehicle wheel having a plurality of spokes substantially channel shaped in cross-section, and each having a bridging portion across the channel adjacent the radially outward end thereof on the inboard side of the wheel, said bridging portion presenting a rim seat, the web of the channel opposite to said bridging portion having an elongated guideway seat substantially parallel to the axis of the wheel, said spokes having extensions to provide a guideway conjointly with said guideway seat, a bolt rigidly secured to said bridging piece and extending through but spaced from said guideway towards the outboard side of the wheel in a direction parallel to the axis of said wheel, a slide encircling said bolt, movable along said guideway seat, supported by the latter, and presenting a second rim seat, and a nut on the outboard end of said bolt for forcing said slide along said guide seat.

3. A vehicle wheel having a plurality of spokes substantially channel shape in cross-section, and each having a portion adjacent to the radially outward end bridging the channel and presenting a rim seat, the web of the channel opposite to said bridging portion having a guideway extending substantially parallel to the axis of the wheel, and substantially semi-cylindrical in cross-section, a bolt rigidly secured to said bridging piece, and extending through but spaced from said guideway, and a slide substantially semi-cylindrical in cross-section encircling said bolt, movable along said guideway, supported by the latter, and presenting a second rim seat, said bolt being in fixed position and eccentrically mounted with respect to the semi-cylindrical surface of the guideway, whereby said slide is prevented from rotating with respect to said guideway.

4. A vehicle wheel having a plurality of spokes substantially channel shaped in cross-section and each having a bridging portion across the channel adjacent the radially outward end thereof on the inboard side of the wheel, said bridging portion presenting a rim seat, and the web of the channel opposite to said bridging piece on the outboard side of the wheel having a rim-clamp supporting surface, a bolt rigidly secured to said bridging piece and extending toward the outboard side of the wheel, a rim-clamp encircling said bolt and movable on said surface and supported thereby, and presenting a rim seat, and means for forcing said rim-clamp toward said bridging piece.

5. A vehicle wheel body adapted to support a pair of rims, said wheel body having a plurality of spokes substantially channel shaped in cross-section and each having a bridging portion across the channel adjacent the radially outward end thereof on the inboard side of the wheel, said bridging portion presenting a rim seat, and the web of the channel opposite to said bridging piece on the outboard side of the wheel having a rim-clamp supporting surface, a bolt carried by said bridging piece and extending toward the outboard side of the wheel, a rim-clamp encircling said bolt, movable on said surface and supported thereby, and presenting a rim seat, an annular band having its opposite edges adapted to abut with and space said rims, and means for forcing said rim-clamp toward said bridging piece.

6. A vehicle wheel having a plurality of spokes substantially channel shaped in cross-section and each having a bridging portion across the channel adjacent to the radially outward end thereof on the inboard side of the wheel, said bridging portion presenting a rim seat, and the web of the channel opposite to said bridging piece on the outboard side of the wheel having a rim-clamp supporting surface, a bolt rigidly secured to said bridging piece and extending toward the outboard side of the wheel, a rim-clamp encircling said bolt and movable on said surface and supported thereby, and presenting a rim seat, and a nut on said bolt and having a shank portion projecting through said rim-clamp, and said shank having means disposed upon the inboard and outboard sides of said rim-clamp for preventing relative axial movement of said nut and said rim-clamp, and the inboard end of said shank having a recess slightly larger than said bolt for receiving the end of the bolt and guiding the nut onto said bolt when assembling.

CHARLES G. KELLER.